(12) United States Patent
DiFoggio (10) Patent No.: US 10,746,681 B2
(45) Date of Patent: Aug. 18, 2020

(54) NON-FOULING LIQUID ELECTRODES

(71) Applicant: Rocco DiFoggio, Houston, TX (US)

(72) Inventor: Rocco DiFoggio, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 282 days.

(21) Appl. No.: 15/944,134

(22) Filed: Apr. 3, 2018

(65) Prior Publication Data

US 2019/0301277 A1   Oct. 3, 2019

(51) Int. Cl.
*G01N 27/02* (2006.01)
*E21B 47/12* (2012.01)
*G01N 27/07* (2006.01)
*G01N 27/416* (2006.01)

(52) U.S. Cl.
CPC ......... *G01N 27/026* (2013.01); *E21B 47/121* (2013.01); *G01N 27/07* (2013.01); *G01N 27/4162* (2013.01)

(58) Field of Classification Search
CPC .. G01N 27/026; G01N 27/07; G01N 27/4162; G01N 27/28; E21B 47/121; E21B 47/10
See application file for complete search history.

(56) References Cited

U.S. PATENT DOCUMENTS

| 4,065,602 A | 12/1977 | Roche et al. |
| 4,139,421 A * | 2/1979 | Roy .................. G01N 27/4112 204/422 |
| 4,860,584 A * | 8/1989 | Mercer ................ G01N 27/121 73/335.03 |
| 5,336,389 A * | 8/1994 | Dubreuil ............ G01N 27/4114 204/422 |
| 8,841,014 B1 | 9/2014 | Deshpande et al. |
| 8,927,143 B2 | 1/2015 | Stauffer |
| 2015/0219481 A1 | 8/2015 | Kersey |
| 2017/0261357 A1 | 9/2017 | Wang et al. |

FOREIGN PATENT DOCUMENTS

| CN | 102654476 A | 9/2012 |
| JP | S5960250 A | 4/1984 |
| WO | 2009030870 A1 | 3/2009 |
| WO | 2013081845 A1 | 6/2013 |

OTHER PUBLICATIONS

Baldauff, et al.; "Analyzing Muliphase Flow in Horizontal and Deviated Wells";Oilfield Review Interactive, No. 4; 2007; Schlumberger; 9 pages.
Beck, et al.; "Process Tomography: a European Innovation and its Applications"; Meas. Sci. Technol. 7; 1996; IOP Publishing Ltd.; 10 pages.

(Continued)

*Primary Examiner* — Amy He
(74) *Attorney, Agent, or Firm* — Cantor Colburn LLP (57) ABSTRACT

An electrode includes a structure comprising a porous material and an electrically-conductive liquid covering at least a portion of the porous material, wherein the electrode is configured to be immersed in fluids of interest, the electrically-conductive liquid being immiscible in the fluids of interest.

18 Claims, 6 Drawing Sheets

(56) References Cited

OTHER PUBLICATIONS

Brill, James P.; "Multiphase Flow in Wells"; 1987 Journal of Petroleum Technology; Society of Petroleum Engineers; 7 pages.
Chilcott, eta l.; "In Situ Characterization of Fouling in Reverese Osmosis Membranes Using Electrical Impedance Spectroscopy"; Journal of Physics, Conference Series 434; 2013; IOP Publishing, Ltd.; 5 pages.
Dyakowski, et al.; "Applications of Electrical Tomography for Gas-Solids and Liquid-Solids Flows—a Review"; Powder Technology 112; 2000; Elsevier; 19 pages.
Fossa, M. "Design and Performance of a Conductance Probe for Measuring the Liquid Fraction in Two-Phases Gas-Liquid Flows"; Flow Measurement and Instrumentation 9; 1998; Elsevier Science Ltd.; 7 pages.
Gamry Instruments; "Care of Porus Glass Frits"; Retreived on Feb. 16, 2018; Retrieved from the internet:; URL: https://www.gamry.com/application-notes/electrodes-cells/care-of-porous-glass-frits/; 5 pages.
Grieve, Bruce Donaldson; "On-Line Electrical Impedance Tomography for Industrial Batch Processing"; 2002; A theisis submitted to the University of Manchester Institute of Science & Technology; 172 pages.
Heikkinen; et al. "Simultaneous Reconstruction of Electrode Contact Impedances and Internal Electrical Properties. Part II: Application"; 2002; Paper Submitted to Department of Applied Physics, Univeristy of Kuopio; 13 pages.
Holder, David; "Part 1 of Electrical Impedance Tomography: Methods, History and Applications"; Dec. 2004; Institute of Physics Publishing; 61 pages.
Jaworski, et al.; "The Design of an Electrical Capacitance Tomography Sensor for Use with Media of High Dielectric Permittivity"; Meas. Sci. Technol. 11, 2000; IOP Publishing Ltd. 16 pages.
Lee, et al.; "Liquid Gallium Electrode Confined in Porous Carbon Matrix as Anode for Lithium Secondary Batteries"; Electrochemical and Solid-State Letters, 11 (3) A21-A24; 2008; The Electrochemical Society; 5 pages.
Mcewan, et al.; "Wide-Bandwith, high Frame Rate Electrical Impedance Tomography/Spectroscopy"; 2008; Proceedings of the First International Conference on Biomedical Electronics and Devices; SciTePress; 8 pages.
Siddiqui, et al.; "Two-Phase Flow of a Third Grade Fluid Between Parallel Plates"; WSEAS Transactions on Fluid Mechanics; Issue 4, vol. 7, Oct. 2012; 12 pages.
Stacey, Robert W.; "Electrical Impedance Tomography"; Jun. 2006; Theisis; Stanford Geothermal Program Interdisciplinary Research in Engineering and Earth Science; Stanford University; 53 pages.
Yuan, et al.; "Contact Angle and Wetting Properties;"; Chapter 1; Surface Science Techniques; 2013; Springer; 33 pages.

* cited by examiner

NON-FOULING LIQUID ELECTRODES

BACKGROUND

Production of hydrocarbons involves extracting fluids from reservoirs in geologic formations. Typically, the extracted fluids include more than just a hydrocarbon of interest. For example, production of oil may involve producing oil, water and gas. Operators obtain production logs, which provide an indication of an amount of a component relative to other components in extracted fluid, to analyze dynamic well performance and assess the productivity or injectivity of different zones in a reservoir. Production logging helps diagnose problems in wells or monitor a stimulation or completion operation. Further actions involving production, such as changing production parameters or providing further stimulation, are contemplated depending on the results of the production logs. Hence, innovations that improve the accuracy and reliability of production logging would be well received in the production industry.

SUMMARY

An electrode is disclosed. The electrode includes a structure having a porous material and an electrically-conductive liquid covering at least a portion of the porous material, wherein the electrode is configured to be immersed in fluids of interest, the electrically-conductive liquid being immiscible in the fluids of interest.

Also disclosed is an apparatus for measuring an amount of each component in multi-phase fluid flow. The apparatus includes: a conduit configured to contain the multi-phase fluid flow; an electrode disposed in the conduit, the electrode including a structure having a porous material and an electrically-conductive liquid covering at least a portion of the porous material, wherein the electrically-conductive liquid is immiscible in components of the multi-phase fluid flow; an electrical conductor in contact with the electrically-conductive liquid; an impedance sensing circuit in contact with the electrical conductor and configured to sense an impedance of a component in the multi-phase fluid flow using the electrode; and a processor configured to record the sensed impedance over a time period in order to measure the amount of each component in the multi-phase fluid flow.

Further disclosed is a method for providing an electrical interface with fluids of interest. The method includes immersing an electrode in the fluids of interest, the electrode including a structure having a porous material and an electrically-conductive liquid covering at least a portion of the porous material, wherein the electrically-conductive liquid is immiscible in the fluids of interest, and connecting an electrical conductor to the electrically-conductive liquid.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed are apparatuses and methods for providing an electrical interface (e.g., an electrode) to a material of interest that improves the accuracy and reliability of production logging. Measuring three-phase flow (e.g., oil, water and gas) using Electrical Impedance Tomography (EIT), such as with sixteen electrodes evenly spaced around the circumference of a conduit or pipe, has a number of advantages including: very fast (e.g., 1,000 frames per second) measurements, gas and liquids imaging, accurate high speed gas fraction determination, and accurate gas velocity measurements from cross correlation. Prior art EIT also has several disadvantages, chief of which is that it requires galvanic contact of electrodes to the fluid. Unfortunately, as little as one micron of coating on an electrode can foul it and prevent meaningful collection of data. As disclosed herein, non-fouling, self-regenerating, electrically-conductive liquid electrodes are used for EIT and other applications requiring an electrode immersed in a material of interest. In one or more embodiments, a liquid electrode is a fine-pored, permeable solid filled with a wetting, electrically-conductive liquid. This liquid should be immiscible in oil, water, and gas, not chemically react with the porous solid, and be stable at borehole conditions of high temperature and pressure without decomposing or evaporating, and be much more electrically conductive than any of the borehole fluids so that there is minimal voltage drop across the electrode itself. The self-regenerating aspect arises from exposed liquid surfaces of the liquid electrode being constantly churned and refreshed by the passing fluids.

Figure 1:
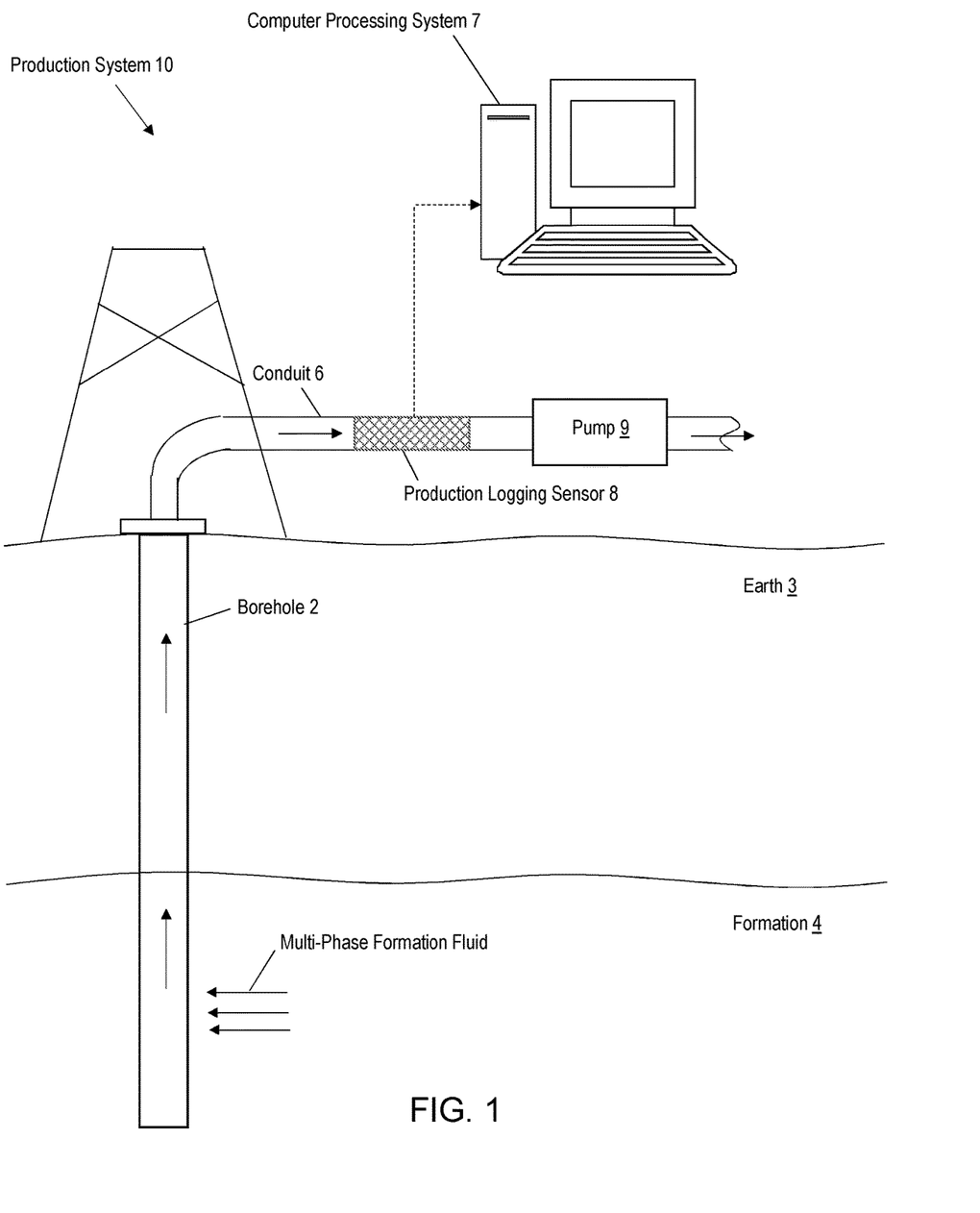
FIG. 1 illustrates a cross-sectional view of a production system having a production logging sensor.

FIG. 1 illustrates a cross-sectional view of a production system 10 configured to extract multi-phase fluids from a formation 4 by way of a borehole 2 penetrating the earth 3. The term "multi-phase" relates to the formation fluid having multiple components such as oil, water and gas as a non-limiting example. The production system 10 includes a pump 9 configured to pump the multi-phase fluids to the surface where the fluids enter a conduit 6. The production system 10 also includes a production logging sensor 8 configured to measure a relative amount of each component (e.g., oil, water, and gas) in a multi-phase fluid flow. The production logging sensor 8 is configured to sense impedance of each of the components in the multi-phase fluid flow as each of the components flows by the sensor 8. A computer processing system 7 is coupled to the production logging sensor 8 and is configured to process data generated by the sensor 8. In one or more embodiments, the computer processing system 7 may be included in the production logging sensor 8. In one or more embodiments, the production logging sensor 8 is configured to identify fluid components by their electrical impedance or to perform Electrical Impedance Tomography (EIT) as is known in the art to provide gas and liquid imaging, accurate high speed gas fraction determination, and accurate gas velocity measurements. EIT is performed by recording sensed impedance over time generally at several different cross-sectional areas in the conduit 6. The sensed impedances over time are then matched to reference impedances that correlate to a type of component in the multi-phase fluid to characterize the fluid.

Figure 2:
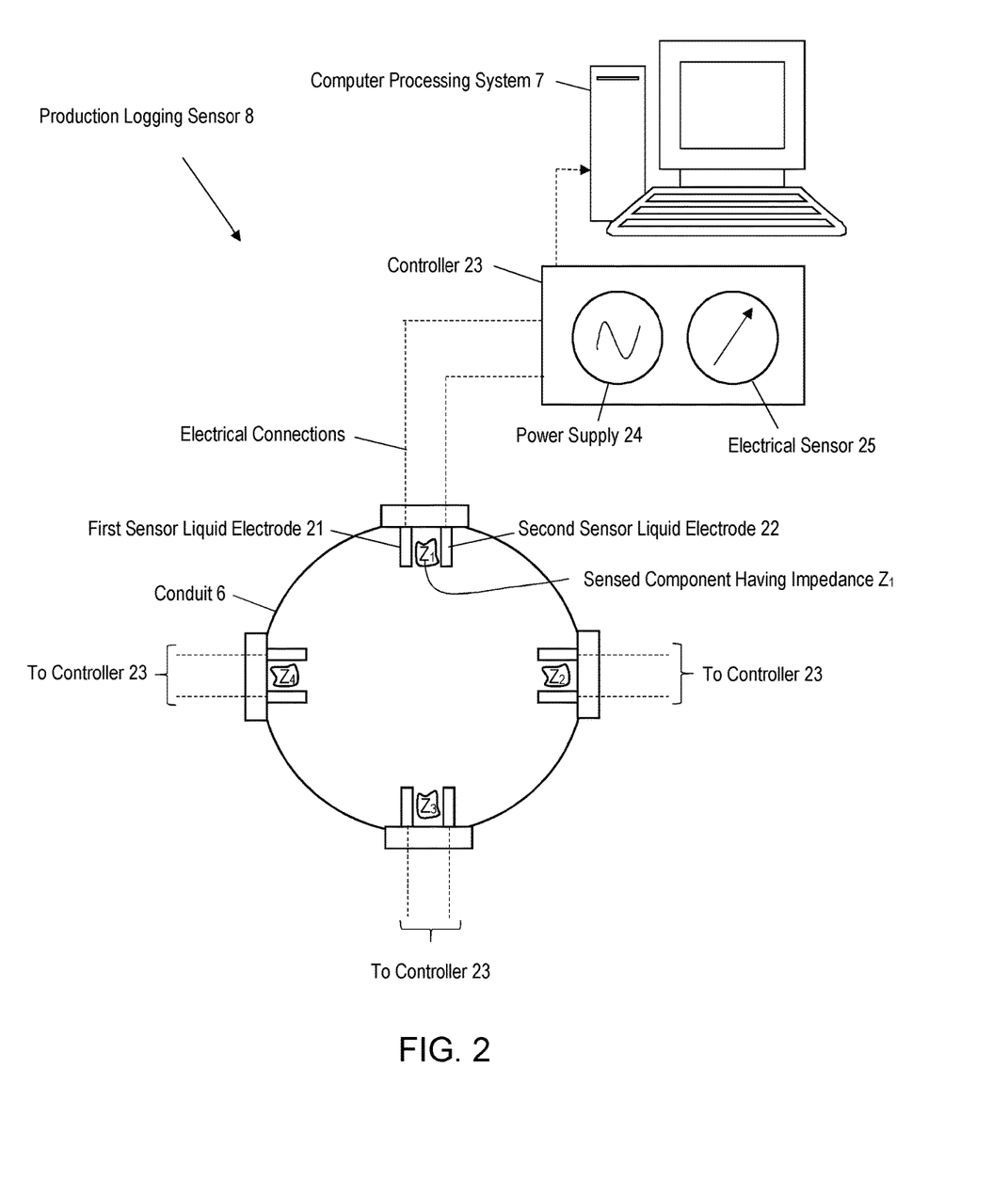
FIG. 2 depicts aspects of an embodiment of the production logging sensor.

FIG. 2 illustrates a cross-sectional view of an embodiment of the production logging sensor 8 configured to identify fluid components by their electrical impedance. The production logging sensor 8 includes a first sensor liquid electrode 21 and a second sensor liquid electrode 22 that protrude into the conduit 6. A controller 23 is configured to apply a voltage across the electrodes 21 and 22 and to sense an amount of current flowing between the electrodes 21 and 22 in a sensed volume in the vicinity of the liquid electrodes 21, 22 in the conduit 6. Using the amount of applied voltage and the amount of current, an impedance $Z_1$ of the component in the sensed volume can be determined. To apply the voltage, the controller 23 may include a power supply 24. To measure a value of the applied voltage and the amount of current, the controller 23 may include an electrical sensor 25 for measuring voltage and/or current. Data processing such as recording impedance (Z) over time and identifying fluid components may be performed by the computer processing system 7. In the embodiment of FIG. 2, there are four pairs of the liquid electrodes 21 and 22 disposed about the circumference of the conduit 6 in order to sense a selected amount of cross-sectional area, and thus amount of sensed volume in the conduit 6. It can be appreciated that there may be more than four pairs of the liquid electrodes 21, 22 disposed about the circumference of the conduit 6 in order to increase the amount of cross-sectional area and corresponding volume that is being sensed. In one or more embodiments, there can be eight or more pairs of liquid electrodes disposed about the circumference of the conduit 6.

It can be appreciated that the production logging sensor 8 may also have different orientations or configurations of the first sensor liquid electrode 21 and the second sensor liquid electrode 22 disposed within the conduit 6. For example, in one or more embodiments, the first sensor liquid electrode 21 may be disposed circumferentially 180° apart from the second sensor liquid electrode 22 or the first sensor liquid electrode 21 may be disposed circumferentially a selected number of degrees apart from the second sensor liquid electrode 22. In one or more embodiments, multiple pairs of the liquid electrodes 21, 22 may be distributed close together and evenly about the circumference or perimeter of the conduit 6 in order to sense an increased cross-sectional area of the conduit 6. The number of pairs of the liquid electrodes 21, 22 disposed in the conduit 6 may be limited by the size of the conduit 6 and the dimensions of the liquid electrodes 21, 22.

Figure 3:
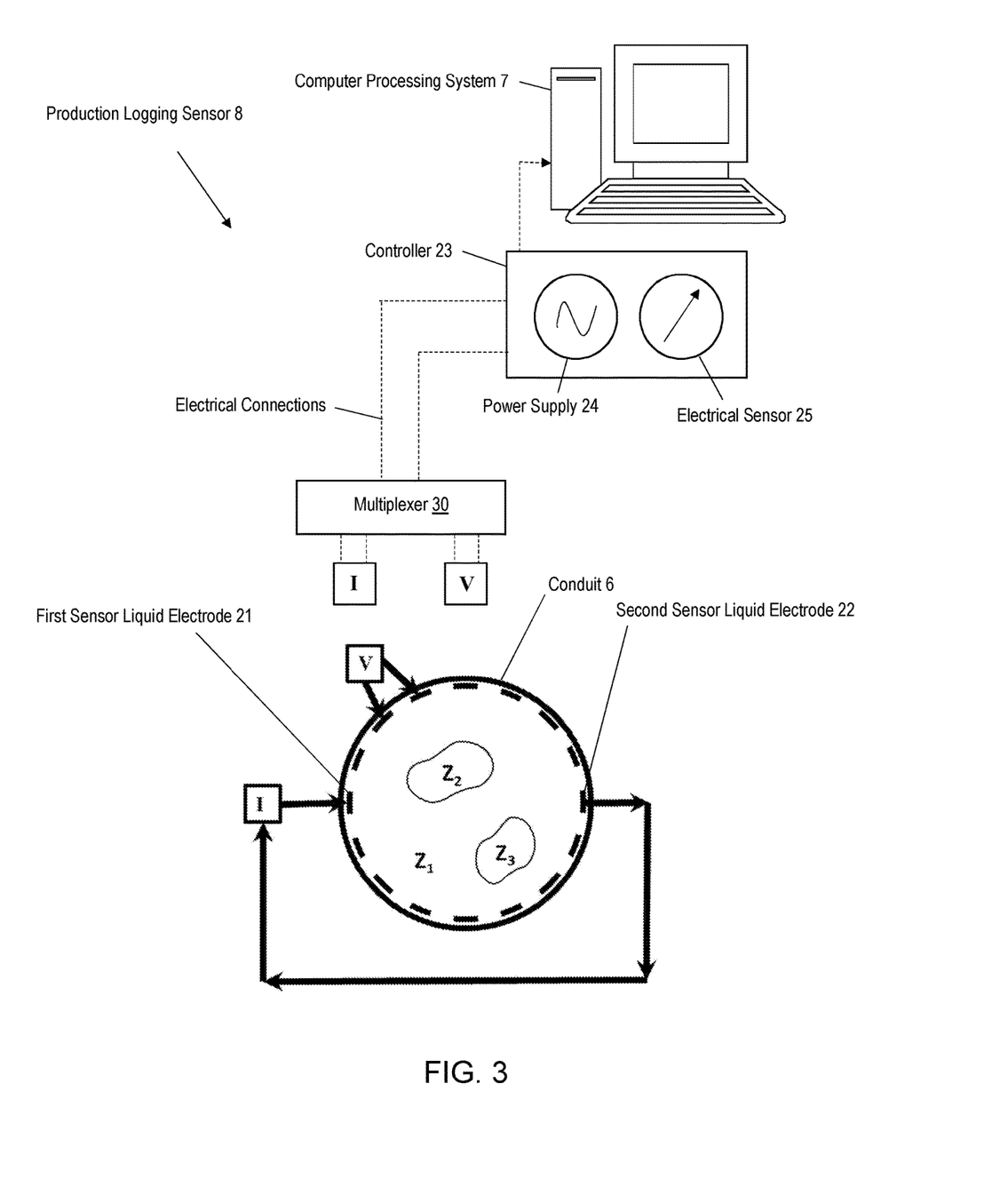
FIG. 3 depicts aspects of the production logging sensor configured to perform Electrical Impedance Tomography.

FIG. 3 illustrates a cross-sectional view of an embodiment of the production logging sensor 8 configured to perform EIT. The production logging sensor 8 in the embodiment of FIG. 3 includes the first sensor liquid electrode 21 and the second sensor liquid electrode 22 that protrude into the conduit 6. What is called the first sensor electrode 21 and what is called the second sensor electrode 22 varies with time as a multiplexer 30 cycles (i.e., connect and disconnect in a programmed sequence) around all the electrodes. The controller 23 is configured to apply a voltage and thus inject an electrical current through the multiplexer 30 across the electrodes 21 and 22 and to sense a voltage across some other pair of electrodes. In this 16-electrode example, a current (I) is applied across a pair of electrodes on opposite sides of the conduit 6 while the voltage (V) is measured between each set of neighboring electrodes. After measuring the pairwvise voltages around the entire circumference, the current-drive electrodes (e.g., 21 and 22) are rotated to the next set of opposite electrodes, and the process is repeated until all 256 sets of voltage measurements is made. From these data, a 2-dimensional electrical image of the different impedance regions is made and the total area of all $Z_1$ impedance regions, and of all $Z_2$ impedance regions, and of all $Z_3$ impedance regions, is computed along with the corresponding fractional areas of each. To inject an electrical current (I), the controller 23 may include the power supply 24. To measure a value of the resulting voltage across other electrodes, the controller 23 may include the electrical sensor 25 for measuring voltage. Data processing such as recording impedance over time and performing EIT may be performed by the computer processing system 7. In the embodiment of FIG. 3, eight pairs of the liquid electrodes 21 and 22 are disposed about the circumference of the conduit 6 in order to sense a selected amount of cross-sectional area, and thus amount of sensed volume in the conduit 6. It can be appreciated that there may be more than eight pairs of the liquid electrodes 21, 22 disposed about the circumference of the conduit 6 in order to increase the resolution within the cross-sectional area and corresponding area fractions that are being sensed.

Figure 4:
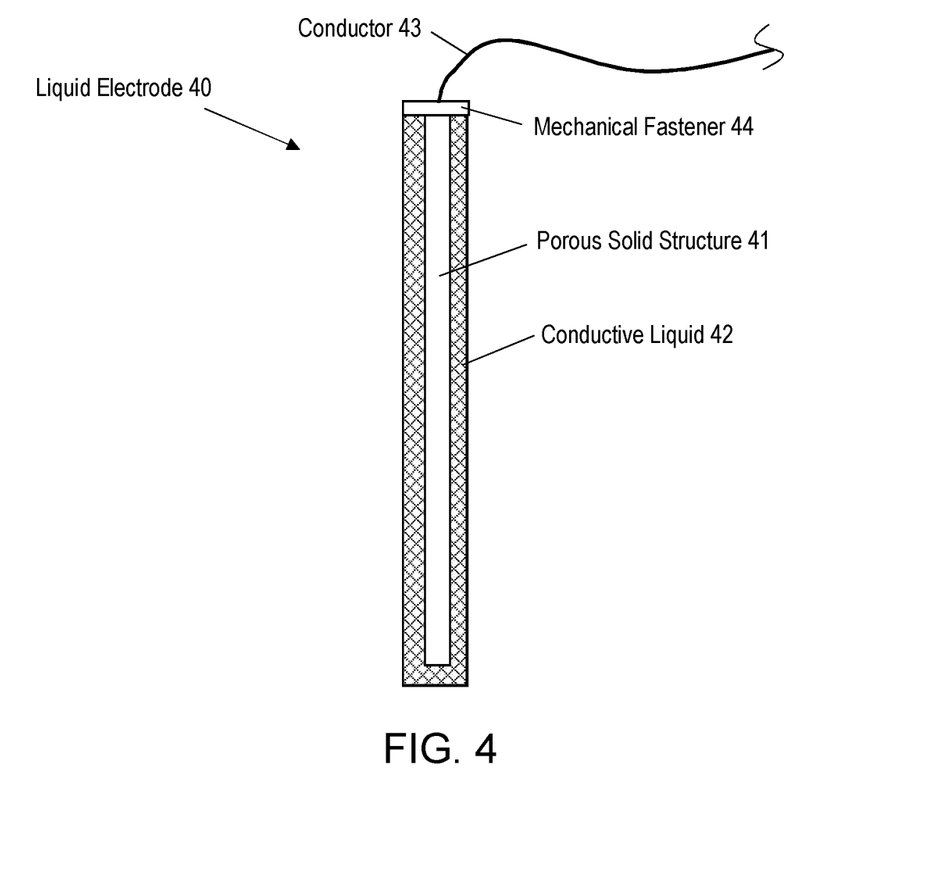
FIG. 4 depicts aspects of an embodiment of an electrode disposed in the production logging sensor.

FIG. 4 illustrates a cross-sectional view of an embodiment of a liquid electrode 40, which may be used for the first sensor liquid electrode 21 and/or the second sensor liquid electrode 22. The liquid electrode 21 includes a porous solid structure 41. In one or more embodiments, the structure 31 is shaped like a slice of a cylindrical shell. The liquid electrode also includes an electrically-conductive liquid 42 that is disposed on the porous solid structure 41. In one or more embodiments, the electrically conductive fluid 42 adheres to (i.e., wets) the porous solid structure 41 by surface tension of the liquid within the pores. In one or more embodiments, the porous solid structure is a glass frit. An electrical conductor 43 for applying voltage and/or flowing electrical current is held in contact with the conductive fluid 42 by a mechanical fastener 44. In one or more embodiments, the mechanical fastener 44 is a threaded fastener such as a screw, which can be screwed into the porous solid structure. In an alternative embodiment, the mechanical fastener 44 includes a spring to keep the conductor 43 forced against and in contact with the conductive liquid 42.

The conductive liquid 42 is selected to be immiscible in expected components of the multi-phase fluid being sensed. For example, gallium, and its liquid alloys such as Galistan® (gallium, indium, and tin with up to 2 weight percent of antimony, Sb, to increase oxidation resistance and up to 2 weight percent of Bismuth. Bi, to improve fluidity) is electrically conductive and is not miscible in oil, water, or gas. Galistan® is used as a nontoxic substitute for mercury in glass thermometers. Although intended here for oil-well production logging where the oil is crude oil, the water is formation brine, and the gas is natural gas, this approach could also be used in industrial applications. In industrial applications, the oil might range from mineral oil to silicone oil or fluorinated oils, the aqueous phase may comprise any water solution, and the gas may be any gas from air to Argon.

Figure 5:
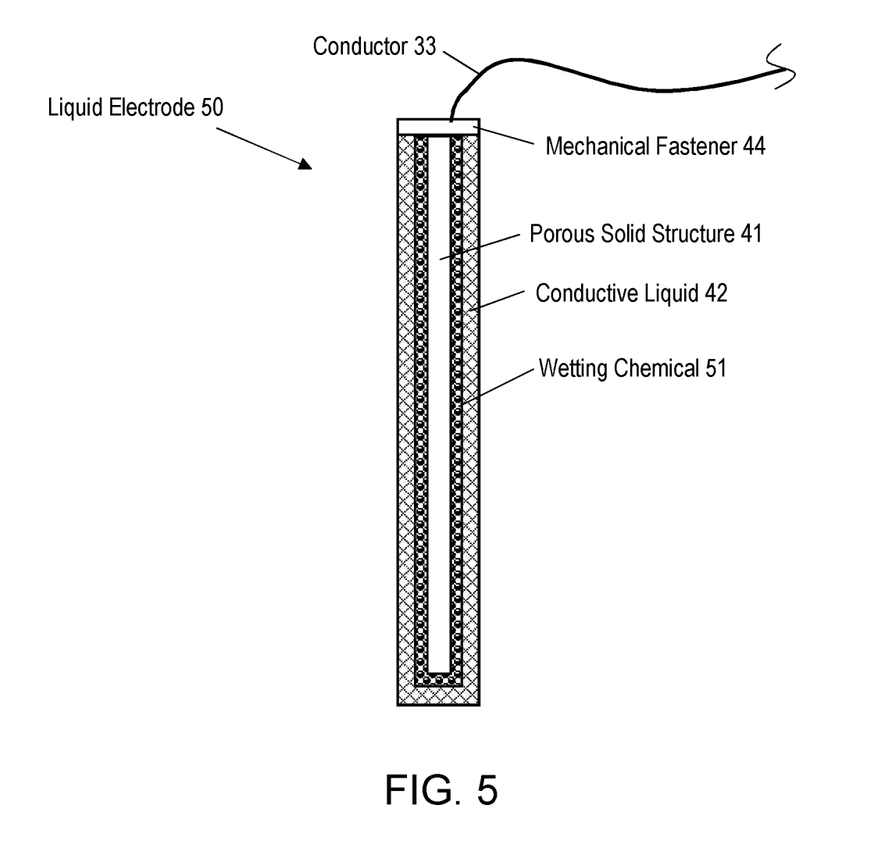
FIG. 5 depicts aspects of another embodiment of the electrode disposed in the production logging sensor.

FIG. 5 illustrates a cross-sectional view of an embodiment of a liquid electrode 50, which may be used for the first sensor liquid electrode 21 and/or the second sensor liquid electrode 22. The liquid electrode 50 includes a wetting chemical 51 disposed on the porous solid structure 41. The electrically conductive liquid 42 in this embodiment is disposed on the wetting chemical 51. The wetting chemical 51 is used to adhere to the porous solid structure 31 and is configured to be wet to the electrically conductive liquid 42.

The term "wet" relates to a liquid being able to stick to a surface as opposed to forming small spheres and "beading up" on that surface. In one or more embodiments, the wetting chemical 51 is gallium oxide, which is wet by gallium That is, a coating of gallium oxide can be applied on all of the exposed surfaces of a glass frit to make gallium metal wet the surfaces of that frit so that it stays in place and does not leave the flit.

Figure 6:
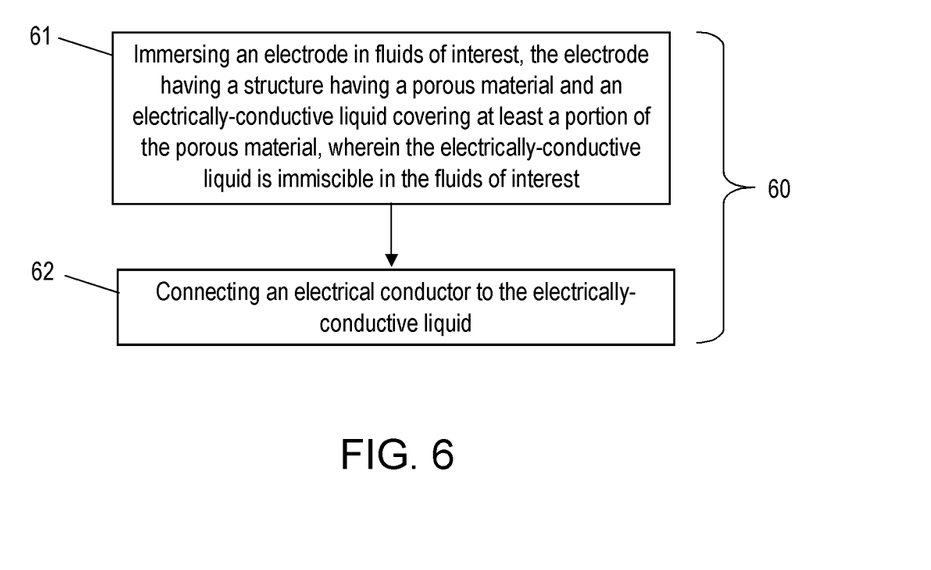
FIG. 6 is a flow chart for a method for providing an electrical interface with a material of interest.

FIG. 6 is a flow chart for a method 60 for providing an electrical interface with a material of interest. Block 61 calls for immersing an electrode in the fluids of interest, the electrode having a structure having a porous material and an electrically-conductive liquid covering at least a portion of the porous material, wherein the electrically-conductive liquid is immiscible in the fluids of interest. Block 62 calls for connecting an electrical conductor to the electrically-conductive liquid. The method 60 may also include applying a voltage to the electrical conductor (with respect to a reference potential) and thus to the electrically-conductive liquid and/or measuring an amount of electrical current conducted by the electrical conductor and thus by the electrically conductive liquid.

As noted above, an advantage of liquid electrodes is that they are non-fouling due to self-regeneration. The surface of the electrically conductive liquid, whose bulk is held in place by its wetting of the porous permeable solid structure, is constantly refreshed or regenerated by the passage of an adjacent immiscible fluid. During flow of adjacent immiscible fluids, the velocity of each fluid is the same at the boundary between the fluids but the velocity differs at points as the points move away from the boundary leading to a "churning" of the surface layer of each fluid, which results in constant refreshing of the surface layers. A liquid metal (i.e., an electrically conductive liquid) is very different in its density and surface tension properties compared to either crude oil or formation brine, so a liquid metal is immiscible in both crude oil and brine and it is electrically conductive. Gallium is one example of a liquid metal that is liquid at room temperature. It can be appreciated that a liquid electrode can be used in applications requiring an electrical interface with a material of interest such that a voltage or current can be applied and/or a voltage or current can be measured using the liquid electrode.

Set forth below are some embodiments of the foregoing disclosure:

Embodiment 1

An electrode comprising: a structure comprising a porous material; and an electrically-conductive liquid covering at least a portion of the porous material; wherein the electrode is configured to be immersed in fluids of interest, the electrically-conductive liquid being immiscible in the fluids of interest.

Embodiment 2

The electrode according to any prior embodiment, wherein the fluids of interest comprise oil, water, and gas.

Embodiment 3

The electrode according to any prior embodiment, wherein electrically-conductive liquid comprises gallium.

Embodiment 4

The electrode according to any prior embodiment, wherein the electrically-conductive liquid comprises a eutectic alloy of gallium, indium and tin.

Embodiment 5

The electrode according to any prior embodiment, wherein the electrically-conductive liquid further comprises at least one of antimony and bismuth.

Embodiment 6

The electrode according to any prior embodiment, further comprising a wetting chemical disposed between the structure and the electrically-conductive liquid, the wetting chemical being wet to the electrically-conductive liquid.

Embodiment 7

The electrode according to any prior embodiment, wherein the wetting chemical comprises gallium oxide.

Embodiment 8

The electrode according to any prior embodiment, further comprising an electrical conductor in contact with the electrically-conductive liquid.

Embodiment 9

The electrode according to any prior embodiment, further comprising a mechanical fastener configured to hold the electrical conductor in contact with the electrically-conductive liquid.

Embodiment 10

The electrode according to any prior embodiment, wherein the structure comprises a cylindrical shape.

Embodiment 11

The electrode according to any prior embodiment, wherein the structure comprises a glass frit.

Embodiment 12

An apparatus for measuring an amount of each component in multi-phase fluid flow, the apparatus comprising: a conduit configured to contain the multi-phase fluid flow; an electrode disposed in the conduit, the electrode comprising a structure comprising a porous material and an electrically-conductive liquid covering at least a portion of the porous material: an electrical conductor in contact with the electrically-conductive liquid: an impedance sensing circuit in contact with the electrical conductor and configured to sense an impedance of a component in the multi-phase fluid flow using the electrode; and a processor configured to record the sensed impedance over a time period in order to measure the amount of each component in the multi-phase fluid flow; wherein the electrically-conductive liquid is immiscible in components of the multi-phase fluid flow.

Embodiment 13

The apparatus according to any prior embodiment, wherein the processor is further configured to match a sensed impedance with a reference impedance of one of the components in the multi-phase flow.

Embodiment 14

The apparatus according to any prior embodiment, wherein the amount of each component relative to all components in the multi-phase fluid flow is derived by dividing a total recorded time of the sensed impedance of a corresponding component by a sum of recorded times of the sensed impedance of all of the components.

Embodiment 15

The apparatus according to any prior embodiment, wherein the components of the multi-phase fluid flow comprise oil, water, and gas.

Embodiment 16

A method for providing an electrical interface with fluids of interest, the method comprising: immersing an electrode in the fluids of interest, the electrode comprising a structure comprising a porous material and an electrically-conductive liquid covering at least a portion of the porous material, wherein the electrically-conductive liquid is immiscible in the fluids of interest: and connecting an electrical conductor to the electrically-conductive liquid.

Embodiment 17

The method according to any prior embodiment, further comprising at least one of applying a voltage to the electrical conductor with respect to a reference potential and measuring an amount of electrical current flowing in the electrical conductor.

Embodiment 18

The method according to any prior embodiment, wherein the fluids of interest comprise oil, water, and gas.

In support of the teachings herein, various analysis components may be used, including a digital and/or an analog system. For example, the computer processing system 7 and/or the controller 23 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer-readable medium, including memory (ROMs. RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" are used to distinguish different elements and are not used to denote a particular order.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electrode comprising:
   a structure comprising a porous material; and
   an electrically-conductive liquid covering at least a portion of the porous material;
   wherein the electrode is configured to be immersed in fluids of interest, the electrically-conductive liquid being immiscible in the fluids of interest.

2. The electrode according to claim 1, wherein the fluids of interest comprise oil, water, and gas.

3. The electrode according to claim 2, wherein the electrically-conductive liquid comprises gallium.

4. The electrode according to claim 3, wherein the electrically-conductive liquid comprises a eutectic alloy of gallium, indium, and tin.

5. The electrode according to claim 4, wherein the electrically-conductive liquid further comprises at least one of antimony and bismuth.

6. The electrode according to claim 1, further comprising a wetting chemical disposed between the structure and the electrically-conductive liquid, the wetting chemical being wet to the electrically-conductive liquid.

7. The electrode according to claim 6, wherein the wetting chemical comprises gallium oxide.

8. The electrode according to claim 1, further comprising an electrical conductor in contact with the electrically-conductive liquid.

9. The electrode according to claim 8, further comprising a mechanical fastener configured to hold the electrical conductor in contact with the electrically-conductive liquid.

10. The electrode according to claim 1, wherein the structure comprises a cylindrical shape.

11. The electrode according to claim 1, wherein the structure comprises a glass frit.

12. An apparatus for measuring an amount of each component in multi-phase fluid flow, the apparatus comprising:
   a conduit configured to contain the multi-phase fluid flow;
   an electrode disposed in the conduit, the electrode comprising a structure comprising a porous material and an electrically-conductive liquid covering at least a portion of the porous material;
   an electrical conductor in contact with the electrically-conductive liquid;
   an impedance sensing circuit in contact with the electrical conductor and configured to sense an impedance of a component in the multi-phase fluid flow using the electrode; and
   a processor configured to record the sensed impedance over a time period in order to measure the amount of each component in the multi-phase fluid flow;
   wherein the electrically-conductive liquid is immiscible in components of the multi-phase fluid flow.

13. The apparatus according to claim 12, wherein the processor is further configured to match a sensed impedance with a reference impedance of one of the components in the multi-phase flow.

14. The apparatus according to claim 13, wherein the amount of each component relative to all components in the multi-phase fluid flow is derived by dividing a total recorded time of the sensed impedance of a corresponding component by a sum of recorded times of the sensed impedance of all of the components.

15. The apparatus according to claim 12, wherein the components of the multi-phase fluid flow comprise oil, water, and gas.

16. A method for providing an electrical interface with fluids of interest, the method comprising:
   immersing an electrode in the fluids of interest, the electrode comprising a structure comprising a porous material and an electrically-conductive liquid covering at least a portion of the porous material, wherein the electrically-conductive liquid is immiscible in the fluids of interest; and
   connecting an electrical conductor to the electrically-conductive liquid.

17. The method according to claim 16, further comprising at least one of applying a voltage to the electrical conductor with respect to a reference potential and measuring an amount of electrical current flowing in the electrical conductor.

18. The method according to claim 16, wherein the fluids of interest comprise oil, water, and gas.

* * * * *